INVENTOR.
STEPHEN E. TOWNSEND
BY Anthony D. Cennamo
Daniel Rubin
ATTORNEYS

INVENTOR.
STEPHEN E. TOWNSEND
BY Anthony D. Cennamo
Daniel Rubin
ATTORNEYS 3,441,668

HIGH INTENSITY FLYING SPOT SCANNER

Stephen E. Townsend, Rochester, N.Y., assignor to Xerox Corporation, Rochester, N.Y., a corporation of New York Filed Jan. 3, 1966, Ser. No. 518,062
Int. Cl. H04n *5/40, 3/10*
U.S. Cl. 178—7.2 4 Claims

ABSTRACT OF THE DISCLOSURE

A method of increasing the effective light output of a cathode ray tube flying spot scanner without shortening the life of the tube wherein the electron beam is modulated in the vertical direction as it is recurringly swept across the face of the tube. The amplitude of modulation is small as compared to that necessary for full deflection, resulting in the electron beam sweeping a larger area of the phosphor face of the tube. A lens system between the tube and a document to be scanned collimates and refocuses the rays into a fine point of light on the document.

This invention relates to graphic communications systems and more particularly to image exploration devices used therein.

Facsimile systems in general concern themselves with the transmission of information pulses representative of the information on a document. At a facsimile receiver these information pulses are reconstituted and printed so that a copy of the original document is obtained. The transmitter usually consists of a scanning device for scanning the document with a beam of light such that the reflection from the document will energize a photomultiplier tube or similar device. The intensity of the reflected light will be greater where there is white material than where there is black information on the document due to the increased light absorption of black over white. Thus, the signal output from the photomultiplier tube will be proportional to the information printed on the document. Such pulses are then amplified and transmitted to the receiver by such transmission systems as direct wire, microwave installations, or radio transmission. At the facsimile receiver the information pulses are decoded and applied to a printer for the reproducton of the original document. The printer may comprise a cathode ray tube similar to the type that may be used in the transmitter wherein the beam is directed onto a photoconductive drum for subsequent production of the facsimile by an automatic xerographic machine. Such a xerographic facsimile system can be seen by examination of U.S. Patent No. 3,149,201, to Huber et al. Other printers include the electrolytic, spark, or hammer-type systems, for example.

One specific type of scanning device is that of a flying spot scanner. This consists of a cathode ray tube on the face of which is the normal phosphor coating. The electron beam is swept horizontally across the phosphor face of the tube generating a moving spot of light which by a lens system is directed onto the document to be scanned. The light reflected from the white or light colored areas of the document to a photomultiplier tube as in the above paragraph.

One problem inherent in such prior art flying spot scanners is the relatively short life of the phosphor coating on the face of the tube due to the high intensity spot constantly retracting the same path. In a cathode ray tube the emitted light intensity is proportional to the energy of the electron beam which impinges on the phosphor coating. A desired increase in light intensity necessitates an increase in the voltage potential applied to the beam with a resultant shortening of the useful life of the cathode ray tube. Repetitive scanning along the same path of the cathode ray tube results in eventual burning of the phosphor coating with a subsequent decrease in the effective light intensity obtained.

Another problem inherent in prior art flying spot scanners relates to the particular light intensity emitted for a particular electron beam potential. That is, for a desired light intensity a certain beam potential is required. To increase the output light intensity a higher beam potential is needed for phosphor impingement. However, the higher intensity impingement by the electron beam may shorten the life of the tube by burning the phosphor coating. This problem arises also for the conventional incandescent lamp scanner utilizing a reciprocating mirror to reflect the light over the face of the document to be scanned. To increase the light output intensity of such an incandescent lamp a larger supply voltage is required, which has the deleterious effect of shortening the life of the filament. Replacement time and costs are expensive and cause needless "down-time" periods of the system.

It is therefore, an object of the present invention to prolong the useful life of an illumination source in an image scanning device.

It is another object of the present invention to prolong the useful life of a cathode ray tube in an image exploration apparatus.

It is another object of this invention to reduce burning effects in cathode ray tubes used for image exploration in facsimile transmissions systems.

It is another object of the present invention to increase the effective light output of a cathode ray tube flying spot scanner without shortening the life of the tube.

In accordance with these objects a preferred embodiment of the invention modifies a commonly known cathode ray type flying spot scanner. Coupled to the scanner are the common deflection and scanner circuits for the generation of the recurring sweep necessary. Selectively coupled to the vertical deflection circuit is a modulator for selective modulation of the scanned sweep. The frequency of the modulator is many times that of the sweep scan. Thus as the electron beam is recurringly swept across the face of the tube it is also being modulated in the vertical directions. The amplitude of the modulation is small as compared to that necessary for full screen deflection. As a result, the electron beam sweeps a larger area of phosphor than is usually desired. A lens system between the scanner tube and the document to be scanned collimates and refocuses the rays into a fine point of light on the document for subsequent reflection to a photomultiplier tube or similar device.

For a more complete understanding of the invention, as well as other objects and further features thereof, reference is had to the following detailed description in conjunction with the drawings wherein.

Figures 2, 3A, 3B:
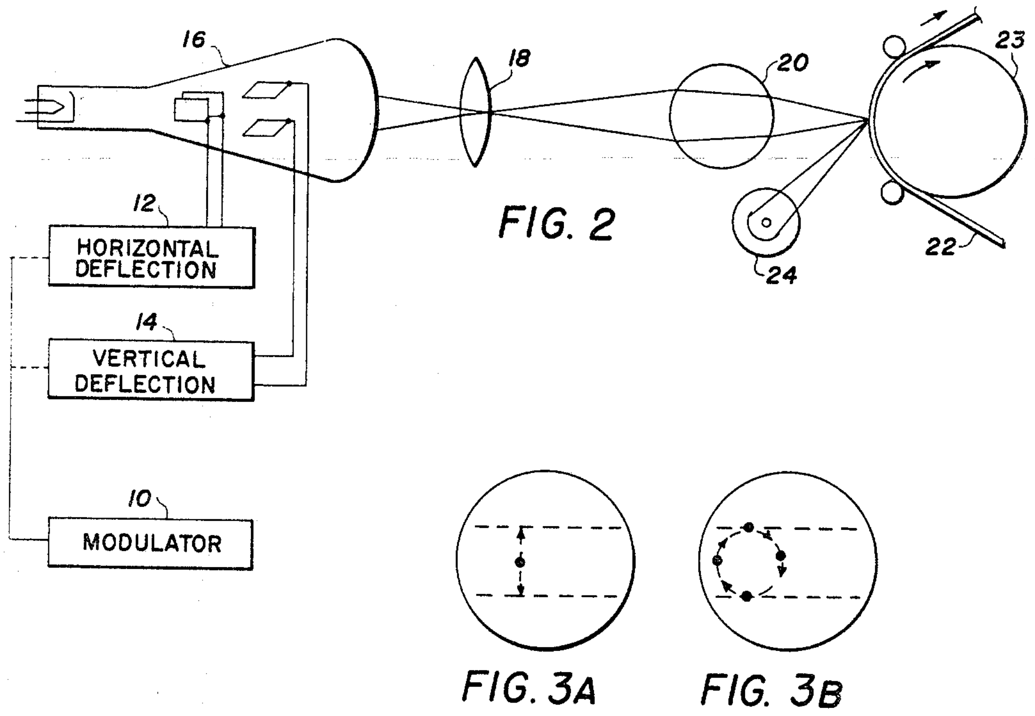
FIGURE 2 is a more detailed block diagram of a flying spot scanner and associated apparatus incorporating the invention.
Figure 4A:
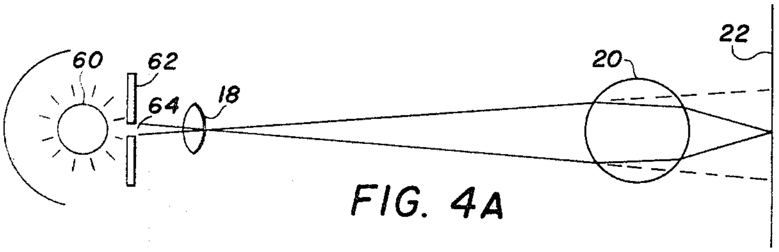
Figure 4B:
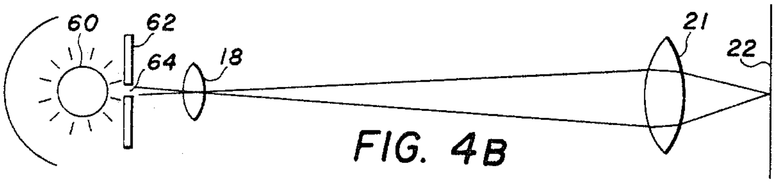

FIGURES 3*a* and 3*b* are representative drawings of the face of the cathode ray tube showing diagrammatically the modulation scheme in accordance with the present invention;

FIGURES 4*a* and 4*b* are schematic diagrams of the invention utilizing different lens system.

Figure 1:
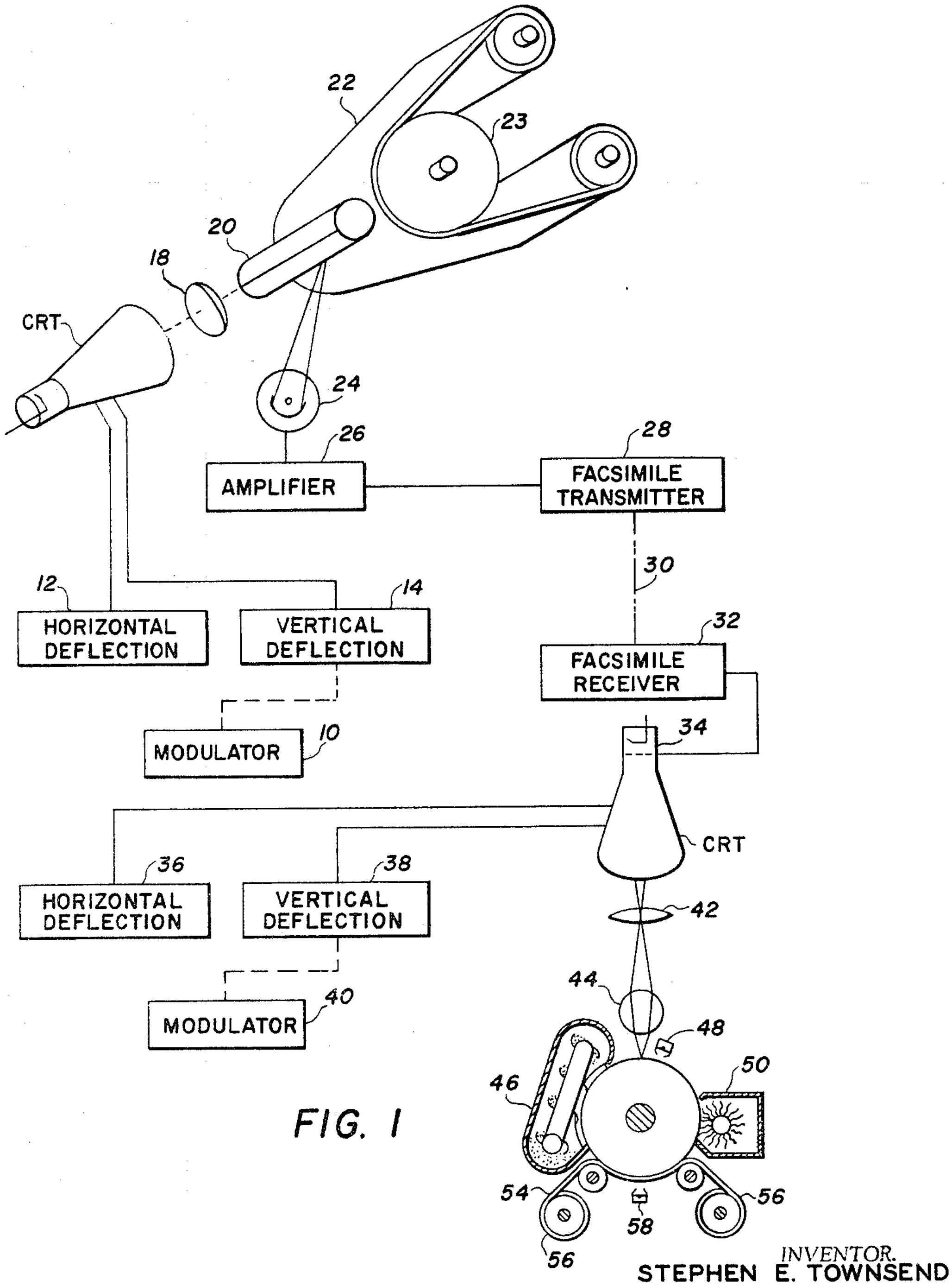
FIGURE 1 is a block diagram of a facsimile system utilizing the principles of the present invention.

Referring now to FIGURE 1, a preferred embodiment, the transmitter section of the facsimile system can be seen to comprise a cathode ray tube flying spot scanner 16 for scanning a document 22. Coupled to the flying spot scanner 16 is the horizontal deflection circuit 12 and vertical deflection circuit 14, having as a selective input the modulator circuit 10. The light output from the excitation of the phosphor coating on the cathode ray tube is focused onto elongated lens 20 by means of lens 18. As the document 22 on drum 23 is continuously brought under the lens 20, by means not shown, the light beam is repeatedly swept across the width of the document. The reflected light from the document is directed to photomultiplier tube 24, the output of which is amplified at 26 and fed to facsimile transmitter 28. By any transmission facsimile means 30 desired, the signal is sent to the facsimile receiver 32, which includes all the commonly known circuits for decoding a transmitted facsimile signal. The output from the receiver 32 is used to energize a printer, which in this case is shown to be a cathode ray tube 34 with horizontal and vertical deflection circuits 36, 38 and other necessary circuitry, not shown, for normal tube operation. A modulator circuit 40 similar to the one of the transmitter is used to modulate selectively the vertical deflection circuit in the manner of the invention. The output from the tube 34 is focused by lens 42 onto the elongtaed lents 44 for exposure of a xerographic drum.

The drum is precharged at charge station 48 before the exposure to the swept beam of light. The drum rotates past the developer station 46 used to coat the drum with developer particles as in the known xerographic process. The drum then rotates and comes in contact with paper 54 from supply reels 56 and by means of charger applied by charging unit 58. The particles are transferred from the drum to the paper for subsequent image fixation for viewing or storing. The drum is then cleaned at station 50 and recharged before re-exposure. This is a continuous process in the production of the facsimile copy. This process is more completely disclosed in Carlson Patent 2,297,691, and other related patents in the field of xerography.

Referring now to FIGURE 2 the invention will be described in more detail. The flying spot scanner 16 is supplied with conventional bias power supplies, not shown, for the normal operation of the tube. Horizontal and vertical deflection plates are shown only for schematic representation and form no part of the invention. The normal sweep rate for such a flying spot scanner would be in the range of 150 c.p.s. The modulator 10 which is selectively coupled to horizontal deflection circuit 12 or vertical deflection circuit 14 has, for example, a cycle rate of 500 kc. If the modulator 10, in the preferred embodiment, is connected as an input to vertical deflection circuit 14 the electron beam, as it is swept across the face of tube 16, will be moved in a vertical direction according to the output rate of the modulator. The amplitude of the signal from the modulator 10 is small compared to the potential necessary for full-screen deflection of the beam. Thus the electron beam will trace out a small band of light across the face of the tube. FIGURE 3*a* is a schematic representation of the face of tube 16 when it is being modulated only in the vertical direction. If the modulator 10, as an alternative embodiment, is connected as an input to both the horizontal and vertical deflection circuits and the amplitude controlled to that level so that there will be no full-screen deflection the electron beam will trace small circles as it is swept across the face of the tube. In either situation this results in not prolonging the useful life of the tube by reducing the burning effect, but increases the effective light output for a particular beam potential. FIGURE 3*b* is a schematic representation of the face of tube 16 under such conditions.

In another embodiment the modulator may be coupled to the focusing means within the tube, whether electrostatic or electromagnetic, instead of the deflection circuits. That is, the bias potential or current applied to the focusing means will be modulated at the design frequency. The amplitude of the modulating signal will again be small as compared to the signal which it is modulating. The effect will be to cause the electron beam to be drawn into and out of focus at the modulation frequency. The subsequent area impinged will be larger than if the beam was in focus, thus effectively illuminating more area, obtaining increased effective light intensity without alteration of beam potential, at the same time decreasing the burning effects on the phosphor screen. An appropriate lens system, not shown, is utilized to culminate the light into the desired spot size on the document.

The light emitted from the face of tube 16, as seen in FIGURE 2, by the impingement of the electrons on the phosphor coating thereon will be focused by lens 18 onto the elongated lens 20 shown schematically. The lens 20 focuses the relatively wide beam of light into a fine point on the scanned document. Such a fine point of light is necessary for the accurate scanning of the document at a normal rate, for example, of 135 lines per inch. It can be seen that if the beam is not focused to such a fine point, resolution will be lost and the resultant facsimile copy will be blurred and inaccurate.

The modulator discussed herein may be one of the many known oscillator circuits. For purposes of illustration, the well known Hartley or Colpitts oscillators may be used. These type of oscillators are used in operations where periodic oscillations of a certain frequency are required. Other circuits may be utilized, the choice of which is not the subject of this invention.

The elongated lens in FIGURES 1 and 2 can be an elongated cylindrical lens 20 or elongated elliptical lens 21 as seen in FIGURES 4*a* and 4*b*. These figures are schematic representations of a light source 60 emitting a beam of light passing through a fine slit 64 in card 62. The light then passes through lens 18 which focuses the beam on the cylindrical lens 20 for the focusing on document 22. A reciprocally rotating mirror may be used to sequentially reflect the light beam across the document. It can be seen that lenses 20 and 21 are necessary in this embodiment, for the light source 60 does not act as a point source of light but a source as wide as the slit. Thus lens 18 is needed for focusing the light obtained through the slit in card 62 on the cylindrical or elliptical shaped lens 20 or 21. These lenses then direct the light ultimately onto a document as a pin point of light with less aberration and distortion. Other lens systems may be used depending upon the particles light source chosen.

Prior art cathode ray tubes utilize two types of deflection, namely, electrostatic and electromagnetic. For electrostatic deflection two pairs of deflection plates are set at right angles to each other. As the electron beam passes between them and as the potential on these plates is changed, the electron beam will be attracted or repelled accordingly. The amount of deflection depends upon the amplitudes of the voltages applied to these plates. Tube 16 in FIGURE 2 schematically shows these plates in their simplest form. Thus, if the modulator output is used to modulate the deflection circuits of an electrostatic cathode ray tube then such signal will be used to modify the voltage potential waveform applied. In electromagnetic deflection, the deflecting force is due to the magnetic field set up within the tube by a set of coils arranged around the neck of the tube. So, if the modulator output is used to modulate the deflection circuits of an electromagnetic cathode ray tube then such signal will be used to modify the current carried to the electromagnetic coils.

The modulation of the electron beam can be seen therefore to increase the area upon which the electron beam impinges on the phosphor coating. The increased area reduces the heat generated on the screen by spreading it out over the larger area impinged. Thus for the same applied potential of the electron beam the cathode ray screen will have a longer effective life due to the fact that more area is covered than the normal thin swept line. Furthermore, it can be seen that for a chosen potential there will be increased light output due to the fact that more area is traced by the electron beam and the limitation of the light output of the phosphor screen for a particular beam potential is overcome. In other words, as a larger area of phosphor is impinged the result is an increased amount of light available. The effect of having an increased light source would mean that there can be an economic advantage in using a smaller scanner tube but retaining the designed light necessary. In addition, in the normal flying spot scanner noise is introduced into the system due to the fact that different microscopic areas of the phosphor will react differently to the incoming electron beam by not emitting the light in a linear manner. By spreading out the area of the beam impingement more phosphor is eliminated thus averaging out the differences in the amount of light the different phosphor particles emit.

While the present invention, as to its objects and advantages, as described herein, has been carried out in a specific embodiment thereof, it is not desired to be limited thereby but it is intended to cover the invention broadly within the spirit and scope of the appended claims.

What is claimed is:

1. In a method of scanning selective elemental areas of a document along a predetermined raster by projecting from the face of a cathode ray tube the light beam emitted by electron beam impingement recurringly deflected in a sweep scan, the improvement comprising the step of modulating the deflection of said electron beam by focusing and defocusing said beam on the face of said cathode ray tube at a predetermined modulation frequency to increase the impingement area thereof.

2. In the method of scanning selective elemental areas of a document along a predetermined raster by projecting from the face of a cathode ray tube the light beam emitted by electron beam impingement recurringly deflected in a sweep scan, the improvement comprising the step of modulating the deflection of said electron beam by deflecting said electron beam in the vertical direction to an amplitude substantially less than the sweep scan to increase the impingement area thereof.

3. The improvement as defined in claim 2 wherein said step of modulating said electron beam further comprises deflecting said electron beam in the horizontal direction to an amplitude substantially less than the sweep scan thereof so that said electron beam traces small circles on the face of the cathode ray tube.

4. The method as defined in claims 1 or 3 including the step of optically focusing the emitted light beam into a desired spot size on a document being scanned.

References Cited

UNITED STATES PATENTS 3,256,388 6/1966 Miller ---------------- 178—7.88

OTHER REFERENCES

Fink, Television Engineering Handbook, pp. 5–42, 1957.

ROBERT L. GRIFFIN, *Primary Examiner.*

ROBERT L. RICHARDSON, *Assistant Examiner.*

U.S. Cl. X.R.

178—7.6; 315—31, 22, 23